United States Patent [19]

Ross et al.

[11] Patent Number: 4,856,842
[45] Date of Patent: Aug. 15, 1989

[54] SELF-STORING, RETRACTABLE AUTOMOBILE COVER

[76] Inventors: Richard E. Ross, 1026 Oak Grove Rd., Concord, Calif. 94518; Donald R. Harvey, P.O. Box 399, Benicia, Calif. 94510

[21] Appl. No.: 156,161

[22] Filed: Feb. 16, 1988

Related U.S. Application Data

[63] Continuation-in-part of Ser. No. 924,754, Oct. 30, 1986, Pat. No. 4,732,421.

[51] Int. Cl.$^4$ ............................................. B60J 7/20
[52] U.S. Cl. ................................. 296/136; 150/166
[58] Field of Search .............. 296/136, 98; 150/52 K; 160/314

[56] References Cited

U.S. PATENT DOCUMENTS

| | | | |
|---|---|---|---|
| 1,567,095 | 12/1925 | Anderson | 160/314 |
| 1,719,055 | 7/1929 | Herzer | 296/136 |
| 1,912,231 | 5/1933 | Wandscheer | 296/136 |
| 1,918,423 | 7/1933 | Perringer | 296/136 |
| 2,751,977 | 6/1956 | Pinkerton | 296/136 |
| 3,222,102 | 12/1965 | Lucas | 296/136 |
| 3,563,594 | 2/1971 | London | 296/98 |
| 3,992,053 | 11/1976 | Hrytzak et al. | 296/136 |
| 4,174,134 | 11/1979 | Mathis | 296/136 |
| 4,324,427 | 4/1982 | Huang et al. | 296/136 |
| 4,657,298 | 4/1987 | Yong O | 296/136 |

Primary Examiner—Robert R. Song
Attorney, Agent, or Firm—Howard Cohen

[57] ABSTRACT

A self-storing, retractable automobile cover apparatus includes a pair of end plates joined in spaced apart disposition by a plurality of rigid tubes. A tubular reel is rotatably secured between the end plates. A cylindrical housing is secured to one of the end plates, enclosing an electric motor operatively connected to the tubular reel through a ratchet drive assembly. A rechargeable battery and recharging circuit, and a receptacle to connect the recharger to AC utility power are also provided in the cylindrical housing. A fabric car cover is adapted to be wound about the tubular reel, with the free end extending between two of the rigid tubes acting as fixed roller guides. Tension applied to the free end of the cover unwinds the cover from the tubular reel, the ratchet drive rotating freely to feed out the car cover. The apparatus is removably secured to one bumper of the auto, and the free end of the deployed cover is extendable to the other bumper. To retract the car cover, the motor is actuated by a switch connected thereto and disposed at the free end of the car cover to rotate and wind the cover about the tubular reel, the cover passing through the fixed guides to control the takeup of the cover onto the tubular reel.

18 Claims, 3 Drawing Sheets

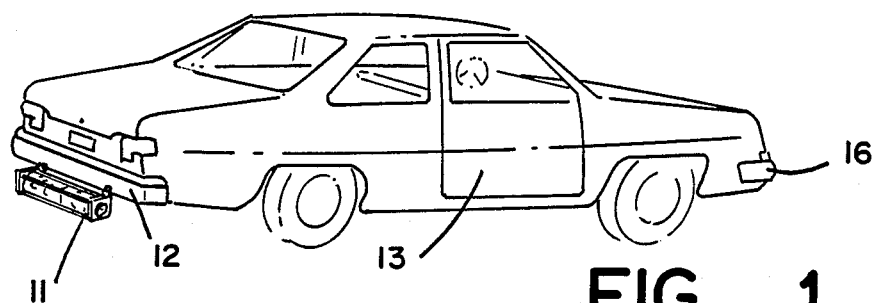
FIG_1
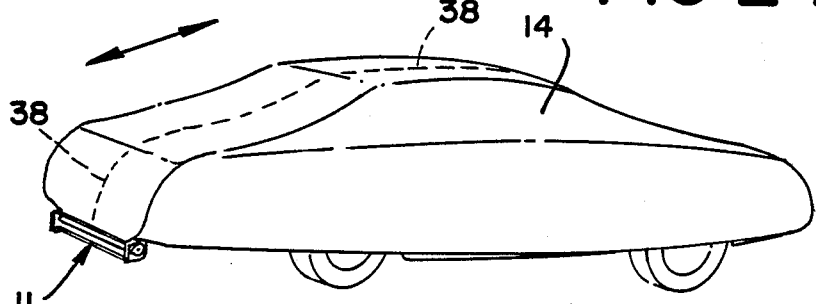
FIG_2
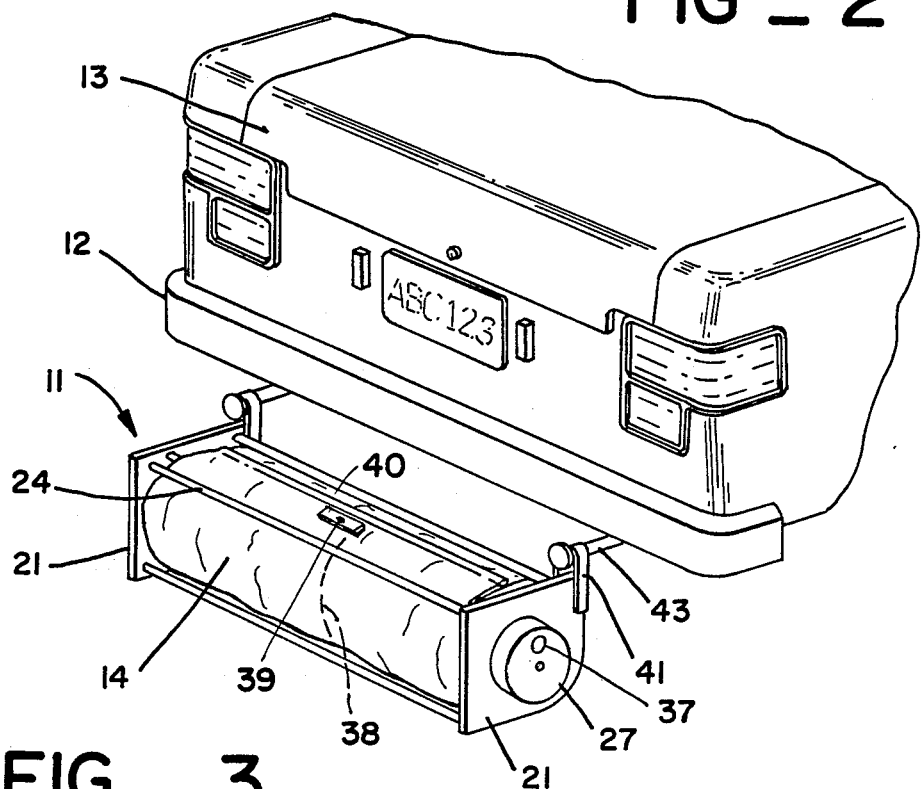
FIG_3

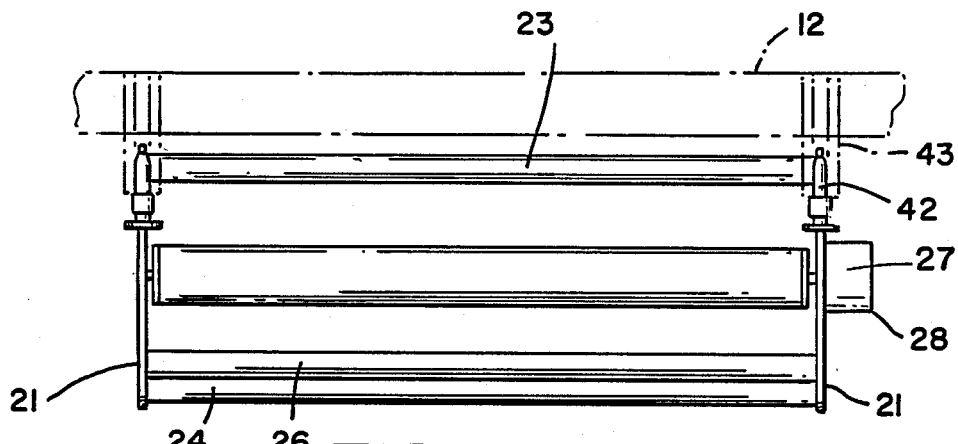
FIG_4
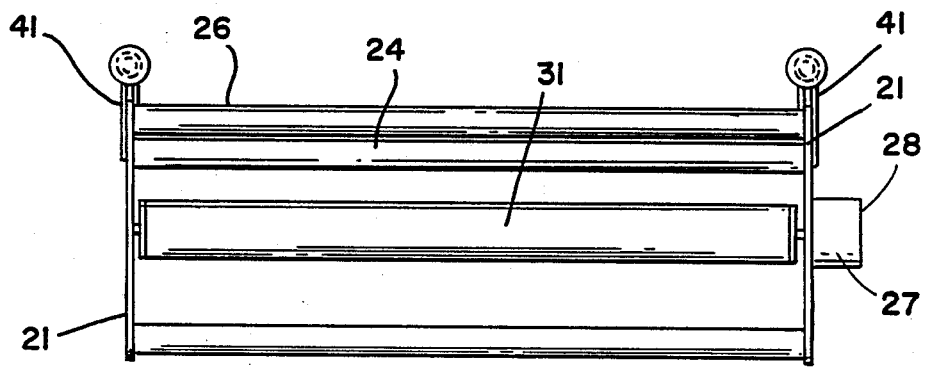
FIG_5
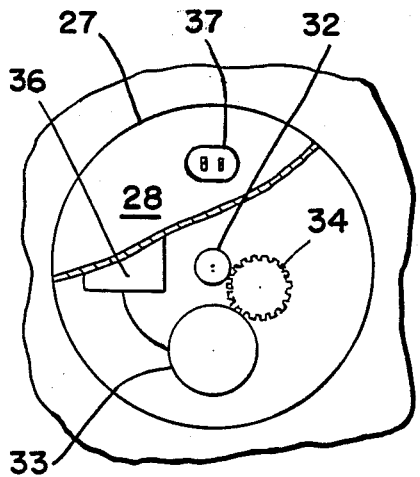
FIG_6
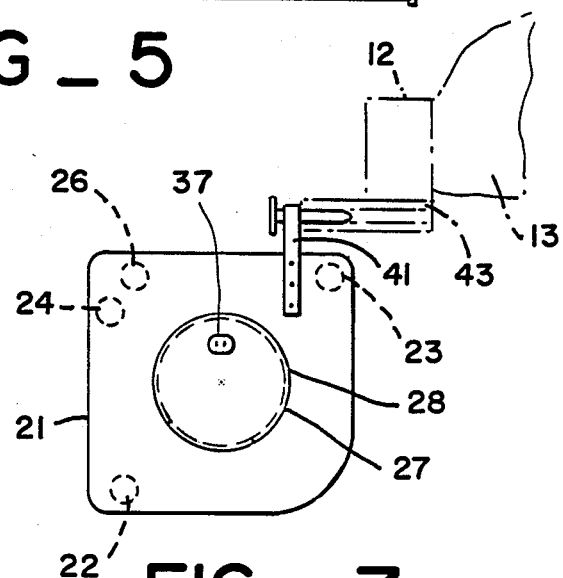
FIG_7

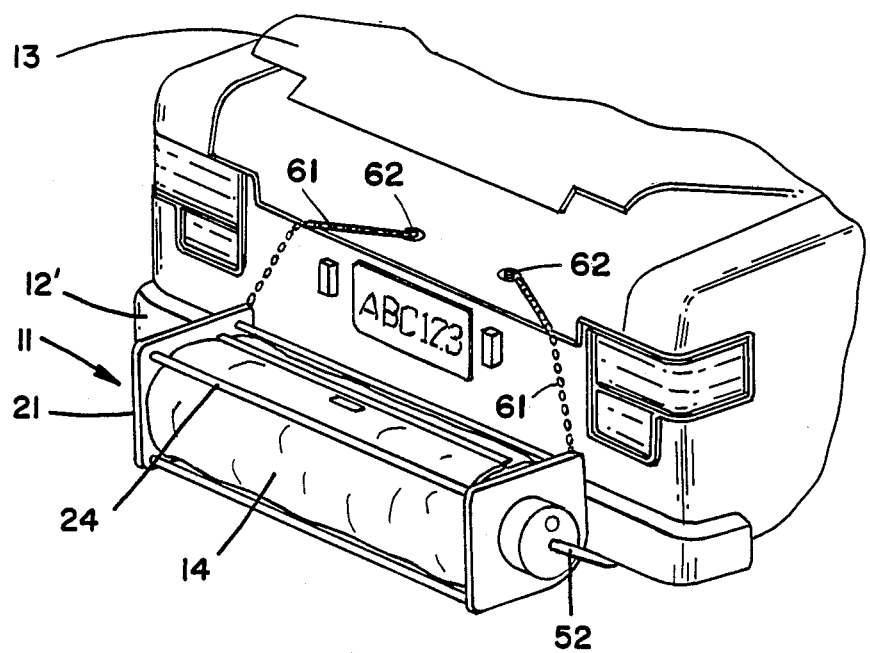
FIG_8
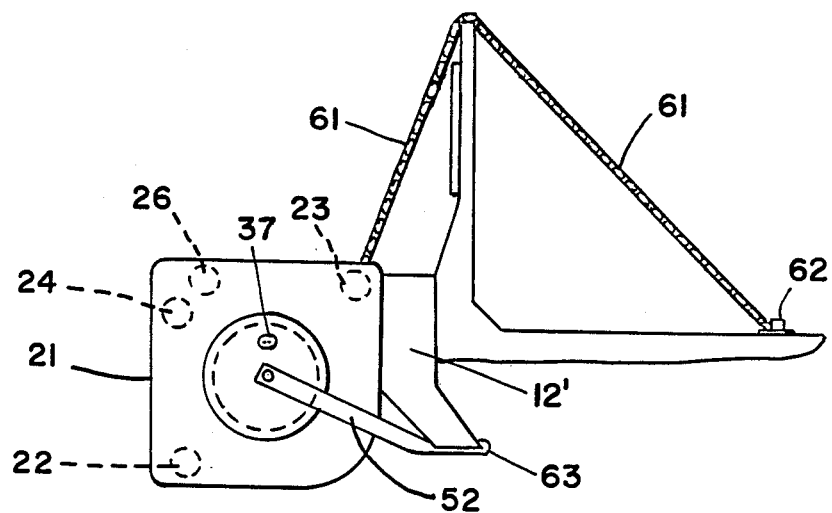
FIG_9

SELF-STORING, RETRACTABLE AUTOMOBILE COVER

REFERENCE TO RELATED APPLICATION

This application is a continuation-in-part of Unites States Patent Application Ser. No. 06/924,754, files Oct. 30, 1986, now U.S. Pat. No. 4,732,421, issued Mar. 22, 1988, for which priority is claimed.

BACKGROUND OF THE INVENTION

There are many settings and circumstances in which an automobile must be parked or stored without benefit of a protective garage or enclosure. The auto is thus exposed to the elements, and may suffer for the exposure. Dirt, dust, dew, tree sap, bird dropping, ice, and snow may collect on the surface of the auto, rendering cleaning and even driving of the auto problematical. Given the fact that there are more and more autos on the highways, and an insufficient availability of parking garages for those autos, it follows that a great many motorists perceive a need for some convenient form of temporary protection for their vehicles.

There are known in the prior many forms of temporary car covers, the most common comprising a fabric construction shaped to fit about a generic automobile conformation. Generally, the fabric cover is secured about the body of the automobile by a plurality of hooks or the like which are releasably joined to the lower edge of the body. The cover is generally rolled or folded for storage. Thus, the fabric cover must be unrolled or unfolded for use, arranged over the auto in proper orientation and position, and hooked to the auto. It may be appreciated that the use of a fabric auto cover is laborious and time-consuming, and is therefore inconvenient and diconsonant with modern life.

It is evident that there is a need for an auto cover arrangement that is easily deployed and stored, and that such an arrangement would likely be commercially successful. However, the state of the art leaves much to be desired in terms of convenience and ease of use. The patent literature dicloses several forms of self-storing auto covers, usually easily deployable and mechanically or automatically retracted for storage. A significant drawback is that such devices are either incorporated into the body of the auto in permanent fashion, or require permanent installation on some structural portion of the auto. These factors determine that such covers must be installed as original equipment, or require custom installation as a specialty item. In either case, the unmet aftermarket demand, comprising the many autos already on the highway, is not addressed.

SUMMARY OF THE PRESENT INVENTION

The present invention generally comprises a self-storing, retractable automobile cover apparatus which is designed to be convenient to use and quick and easy to operate. It is further adapted to be removably secured to the auto, so that is may be stored within the vehicle when not in use. Thus the invention is designed to be sold as an aftermarket item and used on vehicles now in service, or to be provided with new autos as they are first introduced to the public.

The apparatus of the present invention includes a pair of end plates joined in spaced apart disposition by a plurality of rigid tubes. A tubular reel is secured to a pivot shaft rotatably journalled between the end plates. A cylindrical housing is secured to one of the end plates, an electric motor operatively connected to the tubular reel through a ratchet drive assembly. A rechargeable battery and recharging circuit, and a receptacle to connect the recharger to AC utility power are also provided in the cylindrical housing. Wound about the tubular reel is a fabric car cover, with the free end extending from the apparatus between two of the rigid tubes acting as fixed roller guides.

The apparatus is removably secured to one bumper of the auto, and the free end of the deployed cover is extendable to the other bumper. Tension applied to the free end of the cover unwinds the cover from the tubular reel, the ratchet rotating freely to feed out the car cover. To retract the car cover, the motor is actuated by a switch connected thereto and disposed at the free end of the car cover to rotate the tublar reel and wind the cover thereabout, the cover passing through the fixed guides to control the takeup of the cover onto the tubular reel. As the cover passes through the fixed roller guides, the takeup acceleration of the cover onto the tubular reel is attenuated and controlled, and the cover is wound about the tubular reel slowly and with no undue stress applied to the fabric cover. When the cover is fully wound on the tubular reel, the apparatus may be removed from the bumper and placed within the vehicle for storage, or secured to another vehicle for use. The rigid tubes of the apparatus comprise convenient handholds for grasping, handling, and transporting the device.

BRIEF DESCRIPTION OF THE DRAWINGS

FIG. 1 is a perspective view of the apparatus of the present invention, shown joined to the rear bumper of an automobile with the auto cover retracted.

FIG. 2 is a perspective view as in FIG. 1, shown with the auto cover deployed.

FIG. 3 is an enlarged perspective view of the apparatus of the present invention joined to the bumper of an automobile.

FIG. 4 is a top plan view of the self-storing automobile cover apparatus of the present invention.

FIG. 5 is a rear elevation of the self-storing automobile cover apparatus of the present invention.

FIG. 6 is an enlarged, detailed end view of the spring arrangement of the present invention.

FIG. 7 is a partially cutaway side view of the apparatus of the present invention, shown joined to the bumper of an automobile.

FIG. 8 is a perspective view of a further embodiment for mounting the apparatus of the invention to the rear of an automobile in a high security, anti-theft arrangement.

FIG. 9 is an enlarged detailed side view of the anti-theft mounting arrangement shown in FIG. 8.

DESCRIPTION OF THE PREFERRED EMBODIMENT

The present invention generally comprises a self-storing, self-retracting automobile cover apparatus. With regard to FIG. 1, the apparatus 11 of the invention is adapted to be removably secured to a bumper 12 (either front or rear) of an automobile 13. A fabric car cover 14, many forms of which are known in the prior art, is secured to the apparatus 11 and disposed to be deployed therefrom and drawn over the auto (FIG. 2), and extended to the opposed bumper 16 (rear or front). The extended end of the cover 14 may be permitted to hang freely at the respective bumper, or may be secured thereto by devices known in the art, such as hooks, fabric loops, or the like. When the distal end of the fabric cover is released from the the opposed bumper 16, the apparatus automatically retracts the cover 14 and returns it to the confines of the apparatus, as shown in FIG. 3.

With regard to FIGS. 4–7, the apparatus 11 is comprised of a pair of end plates 21 disposed in laterally spaced, parallel disposition, and joined together by a plurality of rigid tubular members 22–26. Although the precise shape of the end plates 21 is not critical, in the preferred embodiment the plates are provided with a generally square configuration with the lower front corner thereof being rounded. The tubular member 23 extends laterally between the upper front corners of the end plates 21, and the tubular member 22 extends between the lower rear corners of the end plates. The tubular members 24 and 26 both extend laterally in closely spaced relationship between upper rear corners of the end plates. The members 24 and 26 not only serve to join the end plates in rigid, spaced apart opposition, they also serve as fixed roller guides for the fabric cover 14, as will be explained in the following description.

The apparatus 11 also includes a cylindrical housing 27, secured to a medial portion of the outer surface of one of the end plates 21. The cylindrical housing 27 includes a cylindrical sidewall and an end panel 28 secured to the outer extent of the cylindrical sidewall (or formed integrally therewith) to define with the end plate 21 a closed cylindrical chamber therebetween. A tubular reel member 31 extends between the end plates 21, the reel member 31 including a pair of pivot shafts 32, each extending axially from one end of the reel member. The end plates 21 are provided with axially aligned holes disposed to receive and journal the pivot shafts 32 in freely rotating fashion, so that the reel member 31 may also rotate freely.

Disposed within the cylindrical housing 27 is an electric motor 33, as shown in FIGS. 5 and 6. The motor 33 is offset from the axis of the respective pivot shaft 32, and is connected through a ratchet gear drive assembly 34 to the pivot shaft 32. The motor 33 is powered by a rechargeable electric power supply 36, which includes an AC-DC converter circuit and a rechargeable electric cell. A power plug receptacle 37 is disposed in the end panel 28, and is adapted to receive a power cable from an AC utility power supply to provide power to recharge the power supply 36. Furthermore, a switch 39 is secured to a handle 40 at the front end of the auto cover 14, and a flexible conductor 38 extends from the switch 39 and is secured to the cover 14 itself. The conductor 38 is connected to form a circuit between the power supply 36 and the motor 32, so that the switch 39 may be selectively actuated to activate the motor and wind the cover 14 about the reel.

It may be appreciated that the fabric auto cover 14 is adapted to be wound about the tubular reel 31. One end (in the embodiment shown, the rear end) of the auto cover is joined to the surface of the tubular reel by means of a leader panel having one end sewn to the auto cover, the opposite end of the leader panel being secured to the reel by adhesive, adhesive tape, rivets or the like. As the cover is drawn by manually applied tension from the reel, the rotation of the shafts 32 proceeds freely due to the fact that the ratchet drive permits free rotation of the associated shaft 32 and the tubular reel in the unwinding direction. To retract the auto cover, the switch 39 is actuated to activate the motor and slowly rotate the reel to wind the cover thereabout.

It may be appreciated that the switch 39 may be located at any convenient location on the auto cover, or on the frame of the device itself. Furthermore, the electric motor may be connected to the electrical system of the vehicle on which it is used, so that the auto battery and alternator provide power to the electric motor 33. In this case the rechargeable power supply need not be provided, and the task of occasional recharging thereof is eliminated.

As noted previously, the cover 14 is led between the members 24 and 26 acting as fixed roller guides. The narrow slot opening between the members 24 and 26 is designed to serve several functions. As the cover is rewinding onto the reel 31, the friction created by the roller guides attenuates the linear acceleration of the cover towards the reel, resulting in a smooth and steady takeup of the cover 14. This action alleviates undue stress to the cover, and extends its useful life. Further, due to the fact that the cover 14 is wider that the spacing of the end plates 21, the roller guides act to gather the cover laterally and direct it onto the reel without snagging or bunching.

A salient feature of the present invention is the provision of means for removably securing the apparatus to the automobile, so that it may be removed and stored within the auto when not in use. As shown in FIGS. 3–5 and 7, a pair of rigid links 41 are provided, each extending upwardly from the upper corner portion of each end plate 21. A mounting pin 42 is secured to the upper end of each link 41 and disposed to extend forwardly therefrom. A pair of tubular mounting lugs 43 are fixedly joined to the bumper structure 12 of the automobile by straps, clamps, or similar devices (not shown), as are well known in the prior art. The lugs 43 are spaced apart identically to the spacing of the mounting pins 42, and disposed to receive the pins 42 therein, as shown in FIG. 7, in sliding fit relationship. Although a ball detent or the like may be provided to retain the pins 42 within the lugs 43, it should be noted that use of the apparatus does not exert any force on the assembly 42–43 which would tend to separate the two components.

Due to the fact that the apparatus 11 depends subjacently from the bumper structure of the auto, it is spaced rather close to the roadway and is therefore not well-suited to accommodate driving of the vehicle. Thus, when not in use, the apparatus may be removed from the lugs 43 by simple rearward force applied to the apparatus. The apparatus may then be placed within the automobile, for example the trunk of the auto, and stored therein until required again. The end plates, tubular members, and reel may be formed of ABS plastic or the equivalent, and the overall weight of the apparatus is quite low, less than 10 pounds for a typical automobile. Furthermore, the tubular members 22–24 and 26 comprise excellent handholds for manual grasping and transport of the apparatus.

With regard to FIGS. 8 and 9, another embodiment of the invention is designed to provide a high security arrangement for removably joining the apparatus of the invention to an automobile without using the mounting apparatus as in the previous embodiments. The apparatus 11 is substantially the same as described above, with the exception that a pair of high security straps 61 or the like are each secured in permanent fashion to one of the upper front corner portions of the end plates 21. (The straps may comprise chains encased in a flexible plastic sleeve, woven metal or high strength fiber webs, or the like.) The straps 61 are provided with sufficient length to extend into the trunk of the automobile, and the free ends of the straps are joined to fasteners 62 secured within trunk. In the preferred embodiment, the fasteners 62 comprise either snap fasteners or screw fasteners secured to the floor or interior rear wall of the trunk.

The apparatus 11 is effectively suspended from the straps 61 extending over the rear sill of the trunk opening. The embodiment further includes a pair of straps 52, each having one end permanently secured to the outer surface of the housing 27. The other ends of the straps 52 are provided with hooks for releasably engaging the lower edge of the bumper 12'. The straps 52 resist the upward thrust imparted to the apparatus 11 when it is deployed out of the trunk and the cover is pulled from the reel. It may be appreciated that when the apparatus is not in use, the hooks 63 may be disengaged from the bumper, and the apparatus may be placed in the truck with the straps 61 engaged by the fasteners 62 to the automobile. The apparatus is thus protected from the elements, and from theft. To deploy and use the apparatus, the trunk is opened, the apparatus is removed therefrom and suspended by the straps 61 adjacent to the bumper, as shown in FIGS. 10 and 11. The hooks 63 are quickly engaged on the lower edge of the bumper, and the trunk lid is closed and locked. The trunk lid closure prevents removal of the apparatus without severing the high security straps 61, and thus deters theft of the apparatus while in use.

We claim:

1. A self-storing, retractable automobile cover apparatus, including; a pair of end members; a plurality of rigid tubes, extending between said end members and rigidly joined thereto to maintain said end members disposed in spaced apart disposition; a tubular reel assembly rotatably secured between said end members; a motor housing secured to one of said end members; an electric motor disposed in said motor housing, means for coupling said electric motor to said tubular reel assembly; a fabric auto cover adapted to be wound about said tubular reel assembly, two of said rigid tubes disposed in closely adjacent, parallel opposition, said fabric auto cover having a free end extending between said two rigid tubes as fixed roller guides, means for actuating said electric motor to rotate said tubular steel assembly and wind said auto cover thereabout, means for removably securing said apparatus to one bumper of the auto, said means for actuating said electric motor including a switch mounted on said auto cover, and a flexible conductor connected between said switch and said motor.

2. The self-storing, retractable automobile cover apparatus of claim 1, wherein said means for removably securing said apparatus includes a pair of tubular mounting lugs, means for joining said mounting lugs to said bumper, and a pair of mounting pins, each extending from one of said end members and dimensioned to be received in said mounting lugs in sliding fit relationship.

3. The self-storing, retractable automobile cover apparatus of claim 2, wherein at least one of said tubular members is disposed to comprise a handhold for said apparatus.

4. The self-storing, retractable automobile cover apparatus of claim 1, wherein said means for coupling said electric motor to said tubular reel assembly includes a ratchet drive assembly disposed to permit free rotation of said tubular reel assembly to unwind said auto cover and to couple the rotation of said electric motor to said tubular reel assembly wind said auto cover about said tubular reel assembly.

5. The self-storing, retractable automobile cover apparatus of claim 4, wherein said tubular reel assembly includes a pair of pivot shafts, each extending from one end of said tubular reel assembly in axial orientation.

6. The self-storing, retractable automobile cover apparatus of claim 5, further including aligned journal holes in said end member and said end panel, said journal holes dimensioned to support said pivot shafts in freely rotating fashion.

7. The self-storing, retractable automobile cover apparatus of claim 1, wherein said flexible conductor is secured to said auto cover and adapted to be wound therewith about said tubular reel assembly.

8. The self-storing, retractable automobile cover apparatus of claim 7, wherein said auto cover includes a first end secured to said tubular reel assembly, and a second, opposed end portion extendable from said tubular reel assembly, said switch being secured to said second, opposed end portion.

9. The self-storing, retractable automobile cover apparatus of claim 8, further including a rechargeable electric power supply connected to said electric motor and secured in said motor housing.

10. A self-storing, retractable automobile cover apparatus, including; rigid frame means, reel means adapted to secure a fabric auto cover wrapped spirally thereabout, means for supporting said reel means on said frame means in freely rotating fashion, driving means for driving said reel means to rotate and wind said fabric auto cover thereabout, switch means at a distal, extendable end of said auto cover to activate said driving means, and means for removably securing said apparatus to a bumper portion of an automotive vehicle.

11. The self-storing, retractable automobile cover apparatus of claim 10, further including a pair of fixed roller guide means secured to said frame means and disposed to direct said fabric auto cover to be wound onto and unwound from said reel means.

12. The self-storing, retractable automobile cover apparatus of claim 11, wherein said means for driving said reel means includes an electric motor operatively connected to said reel means.

13. The self-storing, retractable automobile cover apparatus of claim 12, further including a self-contained, rechargeable power supply connected to said electric motor.

14. The self-storing, retractable automobile cover apparatus of claim 10, wherein said means for removably securing said apparatus includes a plurality of chain members permanently joined to said apparatus, and locking cleat means joined to said automotive vehicle and adapted to lockably secure said plurality of chain members.

15. The self-storing, retractable automobile cover apparatus of claim 14, further including a pair of straps, each having one end joined to an opposed end portion of said apparatus, and means for removably securing an opposed end of each strap to a portion of said vehicle subjacent to said locking cleat means.

16. A self-storing, retractable automobile cover apparatus, including; rigid frame means, reel means adapted to secure a fabric auto cover wrapped spirally thereabout, means for supporting said reel means on said frame means in freely rotating fashion, means for driving said reel means to rotate and wind said fabric auto cover thereabout, and means for removably securing said apparatus to a bumper portion of an automotive vehicle, including a pair of straps having like first ends joined to said frame means, and means for joining like second ends of said straps within the closable trunk of an automobile, whereby said frame means is suspendable from said pair of straps.

17. The apparatus of claim 16, wherein said straps are formed of high stength, high security material, whereby closure of the automobile trunk prevents removal of said apparatus from the automobile.

18. The apparatus of claim 17, further including a second pair of straps extending from said frame means, and hook means for removably securing the free ends of said second pair of straps to the bumper of the automobile.

* * * * *